United States Patent
Bogue et al.

(10) Patent No.: US 9,664,111 B2
(45) Date of Patent: May 30, 2017

(54) CLOSURE OF COOLING HOLES WITH A FILING AGENT

(71) Applicant: UNITED TECHNOLOGIES CORPORATION, Farmington, CT (US)

(72) Inventors: William Bogue, Hebron, CT (US); Ron I. Prihar, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 588 days.

(21) Appl. No.: 13/719,892

(22) Filed: Dec. 19, 2012

(65) Prior Publication Data

US 2014/0166255 A1 Jun. 19, 2014

(51) Int. Cl.
  *F02C 7/12* (2006.01)
  *F01D 5/28* (2006.01)
  (Continued)

(52) U.S. Cl.
  CPC ............... *F02C 7/12* (2013.01); *B23P 6/002* (2013.01); *F01D 5/284* (2013.01); *F01D 5/288* (2013.01);
  (Continued)

(58) Field of Classification Search
  CPC .... C23C 4/00; C25D 7/04; F01D 5/18; B23B 3/10; B23B 35/00
  (Continued)

(56) References Cited

U.S. PATENT DOCUMENTS 5,800,695 A * 9/1998 Kang ............... C25D 5/022
  205/135
5,902,647 A 5/1999 Venkataramani et al.
  (Continued)

FOREIGN PATENT DOCUMENTS

EP 1043480 A2 10/2000
EP 1076106 * 2/2001 ............... C23C 4/00
  (Continued)

OTHER PUBLICATIONS

International Search Report and Written Opinion for related International Application No. PCT/US2013/068745; report dated Nov. 6, 2013.
(Continued)

*Primary Examiner* — Dah-Wei D Yuan
*Assistant Examiner* — Andrew Bowman
(74) *Attorney, Agent, or Firm* — Cantor Colburn LLP

(57) ABSTRACT

A method for filling cooling holes in a component of a gas turbine engine is disclosed. The component may include a plurality of first cooling holes penetrating the wall of the component. The method may comprise the steps of exposing the outer surface of the component, filling the plurality of first cooling holes of the component with a filling agent, curing the filling agent to block the passage of air through the cooling holes, and applying a thermal barrier coating over the surface of the component. The method may further include installing a second plurality of cooling holes, the second plurality of cooling holes penetrating the thermal barrier coating and the wall of the component and allow air to pass therethrough.

10 Claims, 4 Drawing Sheets

(51) Int. Cl.
  *F01D 25/12* (2006.01)
  *B23P 6/00* (2006.01)
  *F01D 5/18* (2006.01)
  *C23C 4/00* (2016.01)
  *C25D 7/04* (2006.01)

(52) U.S. Cl.
  CPC .......... *F01D 25/12* (2013.01); *B23P 2700/06* (2013.01); *C23C 4/00* (2013.01); *C25D 7/04* (2013.01); *F01D 5/18* (2013.01); *F05D 2230/90* (2013.01); *Y02T 50/675* (2013.01)

(58) Field of Classification Search
  USPC .................. 205/135; 428/139; 427/142, 454
  See application file for complete search history.

(56) References Cited

U.S. PATENT DOCUMENTS

| | | | |
|---|---|---|---|
| 6,173,491 | B1 | 1/2001 | Goodwater et al. |
| 6,335,078 | B2 | 1/2002 | Venkataramani et al. |
| 6,758,985 | B2 | 7/2004 | Brooks |
| 8,057,181 | B1 * | 11/2011 | Liang ...................... F01D 5/186 |
| | | | 416/97 R |
| 2001/0007708 | A1 * | 7/2001 | Venkataramani ........ B05D 1/32 |
| | | | 428/139 |
| 2003/0037436 | A1 | 2/2003 | Ducotey, Jr. et al. |
| 2006/0266285 | A1 | 11/2006 | Fernihough et al. |
| 2008/0226871 | A1 | 9/2008 | Klein |
| 2009/0324841 | A1 | 12/2009 | Arrell et al. |
| 2012/0124832 | A1 | 5/2012 | Bunker et al. |
| 2012/0272653 | A1 | 11/2012 | Merrill et al. |
| 2014/0174092 | A1 | 6/2014 | Bogue et al. |

FOREIGN PATENT DOCUMENTS

| | | | |
|---|---|---|---|
| EP | 1350860 | A1 | 10/2003 |
| EP | 1365039 | A1 | 11/2003 |
| EP | 1655454 | A1 | 5/2006 |
| EP | 2078578 | A1 | 7/2009 |
| EP | 2196555 | A1 | 6/2010 |
| GB | 1003222 | * | 6/1965 .............. C23C 4/00 |
| WO | 9835917 | A1 | 8/1998 |

OTHER PUBLICATIONS

European Search Report for European Application No. 13864805.0, dated Aug. 23, 2016, 9 pages.

* cited by examiner

CLOSURE OF COOLING HOLES WITH A FILING AGENT

FIELD OF THE DISCLOSURE

The present disclosure generally relates to a gas turbine engine and, more particularly, relates to the closure of cooling holes of a component within a gas turbine engine.

BACKGROUND OF THE DISCLOSURE

A gas turbine engine commonly includes a fan section, a compressor, at least one combustor, and a turbine. The compressor and turbine each include a number of rows of blades attached to a rotating cylinder. In operation, the air is pressurized in a compressor and is then directed toward the combustor. Fuel is continuously injected into the combustor together with the compressed air. The mixture of fuel and air is ignited to create combustion gases that enter the turbine, which is rotatably driven as the high temperature and high pressure combustion gases expand in passing over the blades forming the turbine. Since the turbine is connected to the compressor via a shaft, the combustion gases that drive the turbine also drive the compressor, thereby restarting the ignition and combustion cycle.

Since the gas turbine engine operates at high temperatures, certain components of the gas turbine engine, such as linear flowpath liners, the turbine, combustor and augmentor, are directly exposed to hot combustion gases, the temperatures of which sometimes exceed the melting temperature of the materials used in the engine components in contact with these hot gases. To prevent damage to the components, solutions are needed to shield the components from excessive heat.

One common solution is to protect the exposed surfaces of the components with a coating system, for example, a thermal barrier coating (TBC) which typically includes a metallic bond coat and a layer of ceramic deposited on the metallic bond coat layer. A typical metallic bond coat includes, for example, MCrAlY, wherein M is Ni, Co, Fe or mixtures thereof. The metallic bond coat provides oxidation and corrosion resistance and accommodates residual stresses which might develop in the coating system. A commonly applied ceramic material is yttria stabilized zirconia (YSZ), which exhibits resistance to thermal shock and thermal fatigue even at 1150° C. (2102° F.). Methods, such as air plasma spraying (APS), low pressure plasma spraying (LPPS), or a physical vapor deposition (PVD) process, such as electron beam physical vapor deposition (EBPVD) are typically used to deposit the ceramic layer on the metallic bond coat.

In addition to applying a TBC to the surface of the affected components, internal cooling of selected engine components, such as turbine blades, nozzles, and liners is employed to further protect the underlying component substrates. To accomplish effective cooling, a complex cooling scheme is usually installed by forcing bleed air to exit from cooling holes on the flowpath surface and form a suitable film of cooling air over the flowpath surface.

When a TBC is damaged during operation or when a new design of TBC needs to be installed, the old TBC often needs to be removed before the new TBC is applied. However, the presence of open cooling holes on the exposed surface of the engine component poses a significant problem for the successful application of a new, high quality TBC layer. Specifically, a non-uniform (or uncompacted) TBC surface susceptible to spallation frequently results when a new TBC layer is directly applied over pre-existing open cooling holes remaining after removal of the old TBC layer. In particular, since new cooling holes are drilled to meter a specific quantity of cooling air on the engine component after a new TBC layer is applied, any subsequent coating spallation may lead to opening of the pre-existing holes and cause an increase in cooling air flow on the component, as cooling air flow is metered by the size and quantity of the cooling holes. The increase in cooling air flow on the component may subsequently starve other downstream components of cooling air causing the downstream components to suffer from structural damage associated with operating at higher than designed temperatures.

It is known that typical weld or braze repair processes may be used to obstruct (block) old cooling air holes. One problem with the brazing approach is that a typical braze material will incrementally lower the incipient melting temperature of areas of inhomogeneous chemistry in the metal alloy of the component, especially on castings, due to the diffusion of boron or silicon into the base metal alloy from the braze material. A second problem with brazing is that wrought alloy properties will be reduced by exposure to brazing process temperatures. Lower melting brazes could be prone to re-melting and with a possibility of resolidifying elsewhere on alloys adversely affected by exposure to the low melting braze constituents. Welding attempts of the old set of cooling holes has proven to introduce substantial distortion into the part associated with solidification of the welds. For both weld and braze repairs, precipitation hardenable alloys such as Inconel 718 or Waspoloy will usually be distorted by the post weld/braze heat treatment required to restore the alloy to a serviceable condition.

To better address the challenges raised by the gas turbine industry to produce reliable and high-performance gas turbines engines, and in particular, to provide engine components with better designed cooling holes, it is desirable to provide a method for filling cooling holes. Specifically, a method which effectively blocks cooling holes of the component of interest to produce a durable component surface before application of a new TBC is desired. It is also desirable that the materials used to block the cooling holes do not induce any structurally detrimental effects in the component material.

SUMMARY OF THE DISCLOSURE

In accordance with one aspect of the present disclosure, a method for filling cooling holes in a component of a gas turbine engine is disclosed. The component may have an outer surface and an inner surface. The component may have a plurality of first cooling holes which extend between the outer and inner surfaces of the component. The method may comprise the steps of: exposing the outer surface of the component, filling the plurality of first cooling holes with a filling agent, and curing the filling agent to block the plurality of first cooling holes.

In another refinement, the step of exposing the outer surface of the component may comprise the step of removing the first thermal barrier coating from the outer surface of the component.

In another refinement, the first thermal barrier coating may comprise a first ceramic top coating overlying a first metallic bond coating.

In another refinement, the method may further comprise the step of applying a second thermal barrier coating over the outer surface of the component after the step of curing the filling agent.

In another refinement, the second thermal barrier coating may comprise a second ceramic top coating overlying a second metallic bond coating.

In another refinement, the method may further comprise the step of installing a plurality of second cooling holes and the plurality of second cooling holes may penetrate the second thermal barrier coating and extend between the outer and inner surfaces of the component.

In another refinement, the step of curing the filling agent to block the plurality of first cooling holes may prevent cooling fluid to pass through the plurality of first cooling holes.

In another refinement, the method may further comprise the step of removing excess filling agent from the outer surface of the component prior to the step of curing the filling agent to level the outer surface for application of the second thermal barrier coating.

In another refinement, the method may further comprise the step of removing excess filling agent from the outer surface of the component after the step of curing the filling agent to level the outer surface for application of the second thermal barrier coating.

In another refinement, the filling agent may be an enamel.

In another refinement, the enamel may be in paint form.

In another refinement, the enamel may be vitreous enamel.

In another refinement, the enamel may be stoved enamel.

In another refinement, the filling agent may be a ceramic paste.

In another refinement, the ceramic paste may be waterglass.

In another refinement, the filling agent may comprise a metal alloy powder to provide surface uniformity between the first cooling holes and the surrounding surface of the component.

In another refinement, the step of filling the plurality of first cooling holes with the filling agent may be performed by dipping the component in the filling agent.

In another refinement, the step of filling the plurality of first cooling holes with the filling agent may be performed by applying the filling agent to the cooling holes with a spraying device, a brush, or a roller.

In another refinement, the step of filling the plurality of first cooling holes with the filling agent may be performed by screeding.

In another refinement, the filling agent may be capable of withstanding a temperature of more than 550° C. without deterioration of the gas turbine engine.

In accordance with another aspect of the present disclosure, a method for filling cooling holes in a component of a gas turbine engine is disclosed. The component may have an outer surface and an inner surface. The component may have a plurality of first cooling holes which extend between the outer and inner surfaces of the component. The method may comprise the steps of: exposing the outer surface of the component, filling the plurality of first cooling holes with a filling agent, curing the filling agent to block the plurality of first cooling holes, and applying a thermal barrier coating over the outer surface of the component.

In accordance with another aspect of the present disclosure, a component of a gas turbine engine is disclosed. The component may have a plurality of first cooling holes extending between an outer surface and an inner surface of the component. The plurality of first cooling holes may be filled with filling agent and the filling agent may be cured to solid form to block the flow of cooling fluid through the plurality of first cooling holes. The outer surface of the component may be coated with a thermal bather coating. The component may further comprise a plurality of second cooling holes penetrating the thermal barrier coating and extending between the outer surface and the inner surface. The plurality of second cooling holes may allow cooling fluid to pass therethrough.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of ceramic spray shield or gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
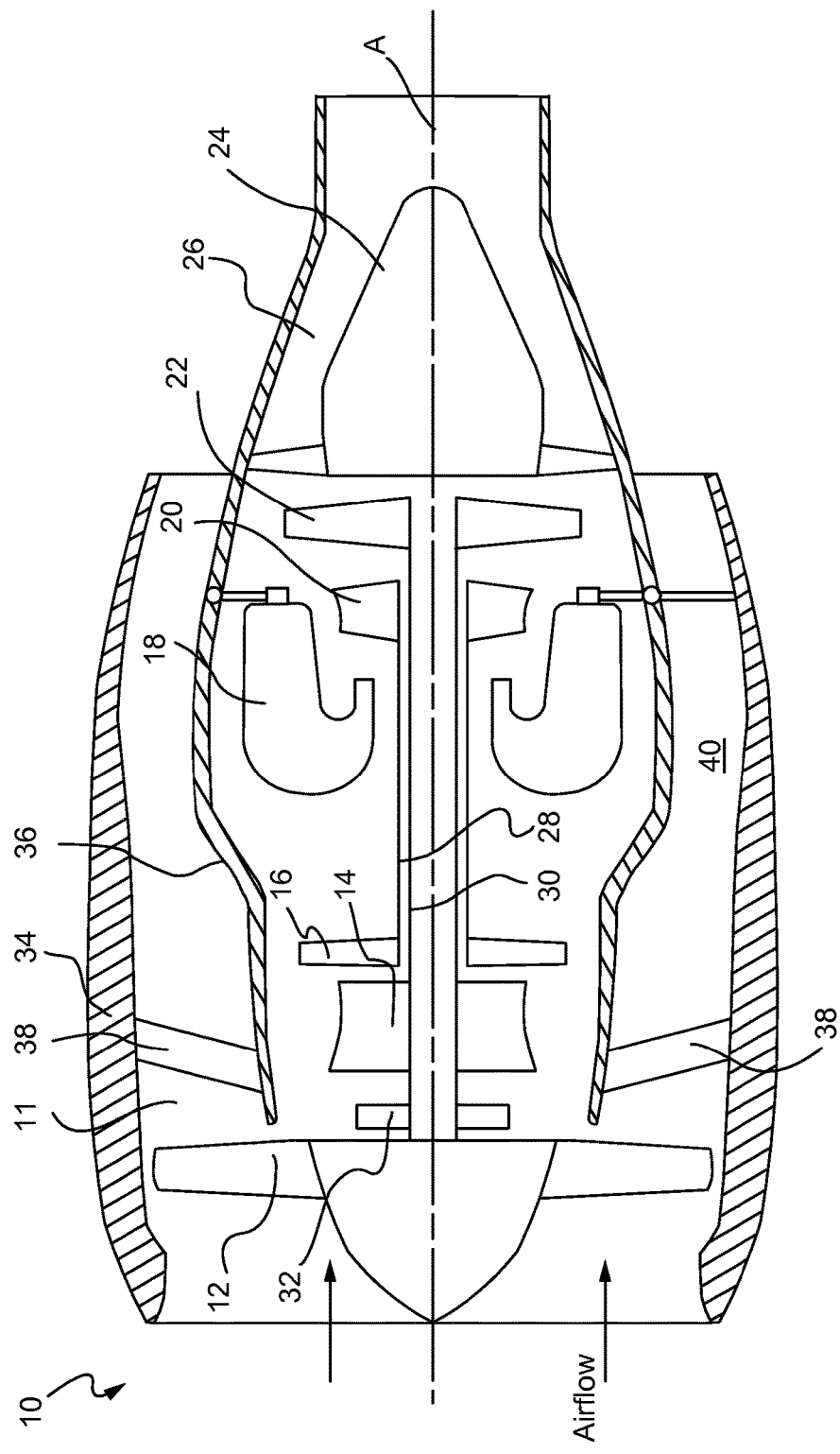
FIG. 1 is a schematic cross-sectional view of an exemplary gas turbine engine.

Referring now to the drawings, and with specific reference to FIG. 1, there is depicted an exemplary gas turbine 10 wherein various embodiments of the present disclosure may be utilized. In this example, the industrial gas turbine 10 may include a compressor section 11 which may comprise, sequentially from the forefront of the gas turbine engine 10, a fan 12, a low pressure compressor 14, a high pressure compressor 16, a combustor chamber 18 downstream of the compressor section 11, a high pressure turbine 20 and a low pressure turbine 22 both downstream of the combustor chamber 18, a tail cone 24, and an exhaust nozzle 26. Further, a high pressure shaft 28 may couple the high pressure compressor 16 with the high pressure turbine 20, while a low pressure shaft 30 may couple the low pressure compressor 14 with the low pressure turbine 22. Both shafts 28 and 30 may be rotatable about an axis A. The low pressure shaft 30 may drive the fan 12 through a gear train 32. On the outside, a fan nacelle 34 may surround both the fan 12 and a core nacelle 36, and may support the core nacelle 36 through pylon structures 38 commonly referred to as upper and lower bifurcations. The core nacelle may house the compressors 14 and 16, the combustor chamber 18, the turbines 20 and 22, and the tail cone 24.

In the example shown in FIG. 1, the engine 10 may be a high bypass turbofan arrangement. During operation, part of the air suctioned by the fan 12 may bypass the core nacelle 36 and enter a generally annular bypass flow path 40 which is arranged between the confines of the fan nacelle 34 and core nacelle 36. The rest of the air may be directed into the core nacelle 36, pressurized in the compressors 14 and 16, and mixed with fuels in the combustor 18 to generate hot gases. The hot gases may expand in and flow through the turbines 20 and 22, which extract energy from the hot gases. The turbines 20 and 22 may then power the compressors 14 and 16 as well as the fan 12 through rotor shafts 28 and 30. Finally, the exhaust gases may exit the gas turbine engine through the exhaust nozzle 26. In power generation applications, the turbines 20 and 22 may connect to an electric generator to generate electricity. In aerospace applications, the exhaust of the turbine 10 can be used to create thrust.

The annular outer and inner liners (not shown) of the combustion chamber 18 bound the combustion process during operation. A portion of the pressurized cooling air is diverted from compressor 16 or other cooling air source and is channeled around the annular outer and inner liners to facilitate cooling during operation. Cooling air is metered through small apertures in the liners to establish a film of cooler air to further reduce the temperature of the liner walls.

Figure 2:
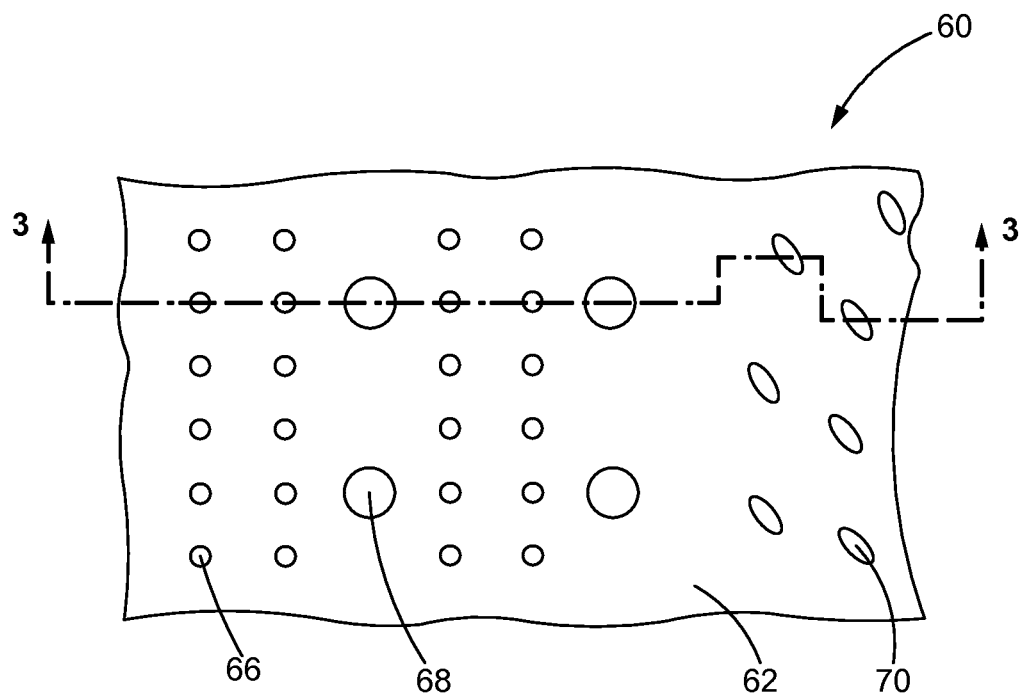
FIG. 2 illustrates a top perspective view of a substrate wall that may be modified according to the present disclosure.

Turning now to FIG. 2, a top perspective view of a substrate wall 60 is illustrated. The substrate wall 60 may be modified by the present method and may be used with or form a part of components within a gas turbine engine 10 (shown in FIG. 1). Such components may be, but are not limited to, the various engine components described above. For example, the substrate wall 60 may be used with or form a part of components such as, but not limited to, liner flowpath panels, combustor liners, ducts, and nozzles. In addition, the substrate wall 60 may be made from a superalloy metal having the ability to withstand high temperatures during operation of the engine. For example, the substrate wall 60 may be made from, but is not limited to, materials such as nickel or cobalt based superalloys. For liners and ducts further downstream, air stream temperature drops, so alloys with lower temperature capabilities such as, but not limited to, corrosion resistant steel or titanium may also be used.

Figure 3:
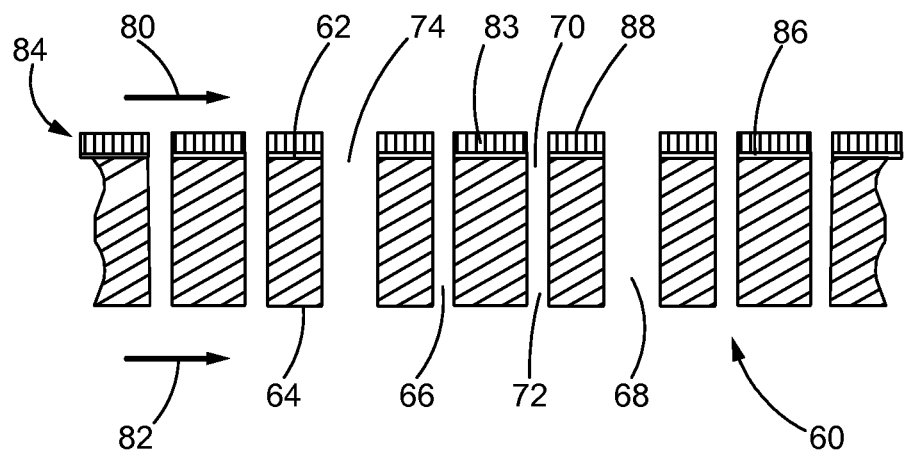
FIG. 3 is a side cross-sectional view through the section 2-2 of FIG. 2, illustrating the substrate wall, in accordance with the present disclosure.

FIG. 3 is a side cross-sectional view through the section 3-3 of FIG. 2, illustrating substrate wall 60. As shown in FIGS. 2-3, the substrate wall 60 may include an outer surface 62 and an opposite inner surface 64. The wall 60 may be perforated or porous and may include a plurality of cooling holes 66, 68, and 70 which are distributed in a spaced relationship across wall 60, as shown. The cooling holes 66, 68, and 70 may extend between the outer and inner surfaces 62 and 64, respectively, as shown. Further, although the shapes of the cooling holes can be a circle or an oval as shown in FIG. 2, other shapes and relative orientations of the cooling holes are possible.

As shown in FIG. 3, each cooling hole 66, 68, and 70 may include an exhaust side 72 and an opposite inlet side 74, as shown. Although the cooling holes 66, 68, and 70 are shown extending substantially perpendicularly through the substrate wall 60 with respect to surfaces 62 and 64, cooling holes 66, 68, and 70 may be obliquely oriented with respect to the surfaces 62 or 64 or may adopt other orientations as well.

As illustrated in FIGS. 2 and 3, the cooling holes 66, 68, and 70 may be substantially cylindrical and may have a diameter, for example, between about 0.02 mm and about 0.1 mm, between about 0.1 mm and about 0.4 mm, between about 0.4 and about 0.7 mm, between about 0.7 mm and about 1.0 mm, and between 1.0 mm and about 1.5 mm. In addition, the cooling holes 66, 68, and 70 may have the same or different diameters with respect to each other.

During operation, combustion gas 80 may flow past the outer surface 62, and cooling fluid 82 may be channeled across the inner surface 64, as shown. Cooling fluid 82 may comprise cooling air or another suitable cooling fluid in gas or liquid form. To insulate the substrate wall 60 from the hot combustion gas 80, the wall outer surface 62 may be covered by a thermal bather coating (TBC) 84, in whole or in part, as desired. TBC 84 may facilitate protecting the outer surface 62 from the combustion gas 80. TBC 84 may comprise a top coating 83 and a metallic bond coating 86, as shown. The top coating 83 may comprise ceramic such as thermally resistant yttria stabilized zirconia (YSZ) or another suitable composition. The metallic bond coating 86 may comprise a material that provides oxidation and corrosion resistance and accommodates residual stress. Metallic bond coating 86 may be a metallic material such as, but not limited to, MCrAlY, wherein M is Ni, Co, Fe, or mixtures thereof. The metallic bond coating 86 may be laminated between the wall outer surface 62 and top coating 83 in order to help enhance the bonding of TBC 84 to the substrate wall 60.

As shown in FIG. 3, TBC 84 may cover the wall outer surface 62 and may not extend over the cooling hole inlet sides 74, as shown. As such, the cooling fluid 82 may be channeled through cooling holes 66, 68, and 70 and through the TBC layer 84 to facilitate cooling an outer surface 88 of TBC 84. However, TBC 84 may extend over a portion of the cooling hole inlet sides 74 but not block the cooling holes completely.

During engine operation, the original TBC 84 may need to be replaced for various reasons. Sometimes a new pattern of cooling holes may be more desirable or advantageous. Sometimes the original TBC 84 may be damaged and may have to be replaced and/or repaired. Sometimes an improved TBC coat may be needed to replace an older system. Sometimes a TBC coat may need to be applied to outer surface 62 in order to upgrade the component. However, if a new TBC layer is directly applied over open cooling holes 66, 68, and 70 on an exposed outer surface 62 of substrate 60, then a non-uniform (or uncompacted) metallic bond coat may be formed under the ceramic top coat in the newly applied TBC layer. This may result in a new TBC layer that is susceptible to fragmentation and/or spallation. After new cooling holes are installed in the substrate wall 60, such unwanted spallation on the TBC layer could lead to opening of the original cooling holes 66, 68, and 70 and produce a corresponding increase in cooling fluid flow on the substrate 60 which may ultimately cause the starving of other downstream components of cooling fluid. In order to remedy this potential problem, cooling holes 66, 68, and 70 may be blocked or obstructed with a filling agent after exposing outer surface 62 and before application of a new TBC layer.

Figure 4:
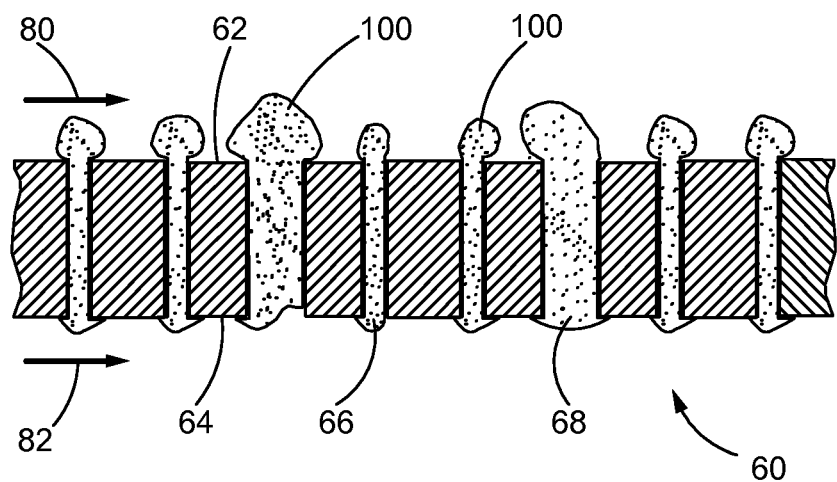
FIG. 4 is a side cross-sectional view of the substrate wall shown in FIG. 3, showing the filling of cooling holes with a filling agent after removing the original TBC layer, according to the present disclosure.

FIG. 4 shows a side cross-sectional view of substrate wall 60, showing the filling of cooling holes 66 and 68 with a filling agent 100 after exposing outer surface 62 by removing the original TBC layer 84. First, TBC 84 may be removed from the outer surface 62 of the substrate 60 using a method or a process known to a skilled artisan to afford an exposed outer surface 62 of substrate wall 60, as shown. Alternatively, removal of another type of coating on outer surface 62 may be required to expose outer surface 62 if a coating other than a TBC is used. Alternatively, removal of TBC 84 (or another type of coating) may not be required to expose outer surface 62 if a TBC layer is to be applied to outer surface 62 for the first time. After exposure of outer surface 62, a filling agent 100 may be used to fill the cooling holes 66 and 68, as shown in FIG. 4.

Filling agent 100 may be an enamel such as vitreous enamel, stoved enamel, or an enamel in paint form. Alternatively, filling agent 100 may be a ceramic paste, such as waterglass or a waterglass slurry. The filling agent 100 may comprise waterglass or other similar ceramic materials that chemically react to solidify. The filling agent 100 compositions used to block the cooling holes preferably are stable at high temperatures. After filling the cooling holes with filling agent 100, the filling agent 100 may then be thermally dried and cured at the appropriate temperature, for example between about 175° C. (~350° F.) to about 370° C. (~700° F.) for providing solidified resin-based enamels, and at higher temperatures for ceramic pastes. However, the skilled artisan will understand that depending on the type of filling agent used as well as other conditions such as the type of substrate wall, other curing temperatures may be appropriate.

In general, filling agent 100 may comprise fillers such as a glass frit, metal alloy powder, and a matrix material such as organic resin, silicone resin, or ceramic binders such as silicates/waterglass or similar ceramic slurries. The filling agent 100 may be applied to a desired region of the substrate wall and subsequently heated to cure the resin or solidify/fuse the inorganic enamel or ceramic paste to the surface of the substrate. The glass frit or frits that comprise the precursor may be prepared utilizing conventional glass melting techniques. A conventional ceramic refractory, fused silica, or platinum crucible may be used to prepare the glass frit. For instance, selected oxides may be smelted at, for example, about 1250° C. for about 30 minutes. The molten glass formed in the crucible is then converted to glass frit using water-cooled rollers and milling equipment. Any of the various techniques to prepare the fits may be known to and employed by a skilled artisan.

On one hand, the glass frit may comprise silica, borax, soda ash, fluorspar, sodium silica fluoride, clays, electrolytes, and metal oxides. On the other hand, organic enamel precursors may be provided as well. These organic enamel precursors may comprise resins, curing agents, plasticizers, stabilizers, fluidity modifiers, and fillers. In addition, the resin may allow the enamel or ceramic paste to have the desired viscosity for application to the substrate walls and allow the enamel or ceramic paste to bond to the substrate wall. The resin may be any medium normally used in conventional enamel compositions and may include solvents, diluents, oils, resin mixtures, petroleum fractions, film-forming materials, and fillers such as alloy powders and thickeners. In particular, the addition of metal alloy powders as fillers may act to improve the similarity between the enamel/ceramic material filling the cooling holes and the outer and inner surfaces 62 and 64 of substrate 60 that surround the holes.

The glass frit component may be used in combination with various mill additions. The mill additions may vary depending upon the specific application conditions being utilized. For waterglass type ceramic paste application processes, the glass frits may be milled in conjunction with other mill additions such as, for example, sodium molybdate, molybdenum trioxide (molybdic acid hydride/ammonium polymolybdate), sodium silicate, quartz, and bentonite to produce a suitable composition. As is well-known in the art, there may be a wide range of other acceptable mill agents or components that may also be utilized in the present disclosure to produce the desired product.

The filling agent 100 may include additional additives such as, for example, one or more surfactants, to achieve a suitably tacky consistency that enables the filling agent 100 to adhere to the composition at the surface of the substrate wall 60. For example, up to about 10 weight percent of a nonionic surfactant may be used. Examples of surfactants commercially available for this purpose may include P521A and Merpol from Witco and Stephan, respectively. Further, filling agent 100 may contain other filler materials, including but not limited to, glass compositions, dispersants, metal alloy powders, and/or additional binders/plasticizers capable of adhering the ceramic powders together. Depending on its composition, the binder of the filling agent 100 may react at room temperature, or its reaction may be accelerated by heating such as with a heat lamp, torch, or other heat source until the strength of the resulting filler has reached a required level for operation in the gas turbine engine. Thermal treatments of filling agent 100 may be about sixteen hours at room temperature to cure a silicone binder, and about two hours at about 150° C. (302° F.) to react a phosphate-based binder. However, other thermal treatment conditions are possible.

The filling agent 100 according to the present disclosure may be suitable for application to substrate wall 60 using conventional techniques such as, for example, either wet or dry application processes. A suitable wet application process may be dipping. Specifically, in order to completely fill the cooling holes with filling agent 100 and achieve complete obstruction of the cooling holes, the substrate 60 may be dipped in the enamel or ceramic paste composition. Alternatively, the cooling holes may be filled with filling agent 100 by applying the filling agent 100 (either enamel or ceramic paste) to the cooling holes with a spraying device, a brush, or a roller. Alternatively, cooling holes may be filled with filling agent 100 by screeding in which the filling agent 100 (either enamel or ceramic paste) is smeared into the cooling holes using a spatula or similar tool. However, other application processes for filling the cooling holes known to a skilled artisan may be used as well.

Substrate walls that have been treated with the filling agent 100 of the present invention may be heated in a conventional manner using conventional heating equipment. Heating is generally conducted in an air convection oven or furnace at a temperature and duration determined sufficient by a skilled artisan. However, other heating conditions may be possible.

The resulting cured filling agent 100 may provide long-term resistance to the atmospheres and temperatures of, for example, the compressors of gas turbine engines, and it may be possible to choose such enamel or ceramic paste in relation to the specified operating temperature of the engine. For example, it is known that certain enamels are capable of withstanding temperatures in the order of, for example, 500° C. (932° F.) or higher. However, the filling agent 100 constituents may be able to withstand even higher temperatures and thus maintain obstruction of the cooling holes even in an event where the matrix material has been thermally degraded.

Figure 5:
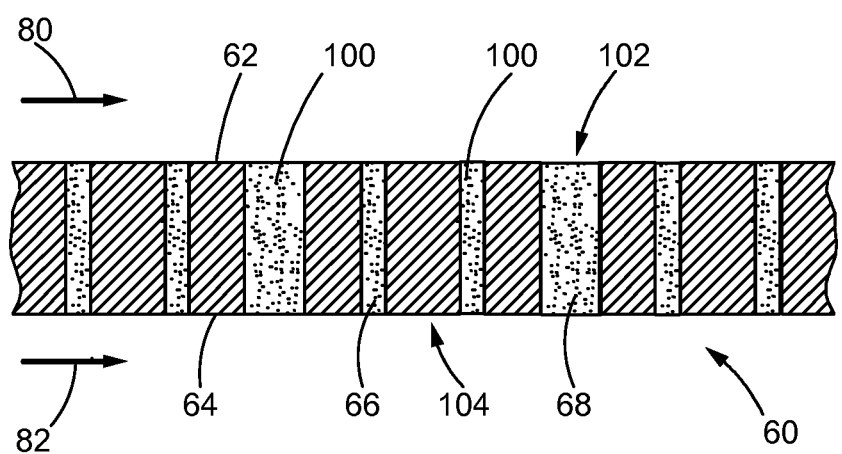
FIG. 5 is a side cross-sectional view of the substrate wall shown in FIG. 4 after removing excess filling agent from the inner and outer surfaces of the substrate wall.

As shown in FIG. 4, filling agent 100 may completely block the cooling holes at both ends and may obstruct the passage of cooling fluid through the cooling holes. Alternatively, filling agent 100 may block one end while substantially blocking the other, or substantially block both ends. A skilled artisan can make the necessary decision whether an acceptable degree of blocking is obtained for the cooling holes to facilitate the subsequent application of a new TBC layer. After the blocking of cooling holes 66 and 68 with filling agent 100, excessive enamel or ceramic paste 100 on the inner and outer surfaces of the substrate wall 60 may be removed by wiping before it cures to reveal the new, leveled outer and inner surfaces 102 and 104, respectively, as shown in FIG. 5. Alternatively, excess filling agent 100 may be removed by abrasive wiping (i.e., sanding) after the curing step. Alternatively, excess filling agent 100 may be removed from only the outer surface (the surface to be coated) by wiping or abrasive wiping before or after the curing step to reveal leveled outer surface 102. Nevertheless, after at least the outer surface is leveled and the filling agent 100 has fully cured and dried, a new TBC layer 106 may be applied to leveled outer surface 102 as described below. Outer surface 102 may be further textured to facilitate the attachment of a new TBC 106. Importantly, obstruction of the cooling holes with the cured filling agent 100 and leveling of the outer surface 102 preferably allows the new metallic bond coat 96 (see FIG. 6) to be applied against a level surface thus achieving an intended degree of structural compactness throughout bond coat 96 that is necessary for avoiding unwanted spallation events.

Figure 6:
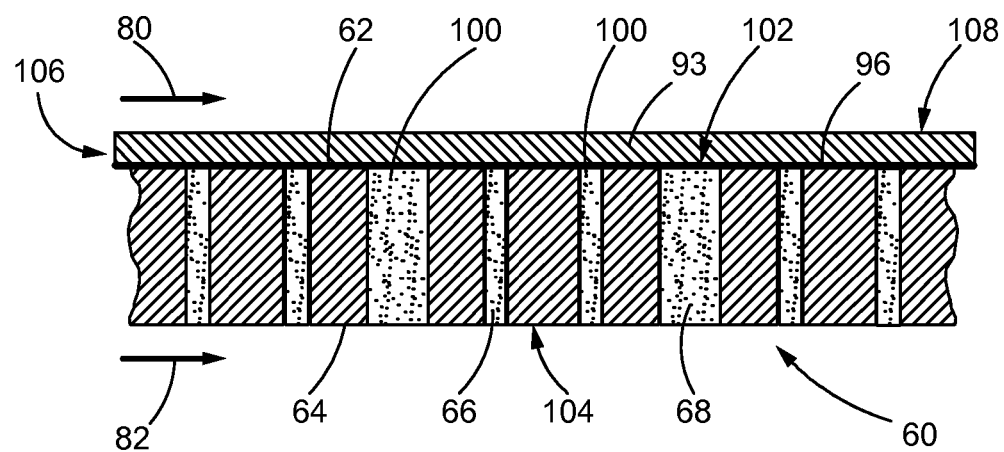
FIG. 6 is a side cross-sectional view of the substrate wall shown in FIG. 5 after the application of a new TBC layer according to the present disclosure.

Turning now to FIG. 6, a side cross-sectional view of the substrate wall 60 with a newly deposited TBC 106 is shown. The new TBC layer 106 is formed by first applying a new metallic bond coat 96 over outer surface 102 and subsequently applying a new ceramic top coat 93 over a new metallic bond coat 96, as shown. The new TBC layer 106 may completely cover the cured filling agent 100 on outer surface 102, as shown. The deposition method for application of the new TBC layer 106 may be a thermal spray technique or a physical vapor deposition technique or other suitable processes. The crude surface of the TBC 106 may be polished or otherwise abraded to give an outer surface 108, as shown.

Top coat 93 may be a ceramic material which may adhere to metallic bond coat 96. The ceramic material may comprise a thermally resistant material such as, but not limited to, yttria stabilized zirconium (YSZ). Metallic bond coat 96 may be formed from, but is not limited to, MCrALY, where M is Ni, Co, Fe, or mixtures thereof.

Figure 7:
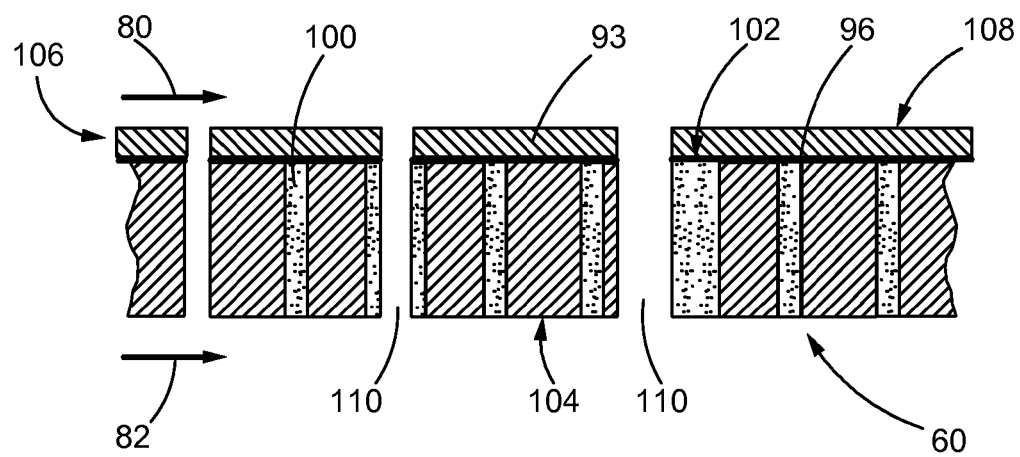
FIG. 7 is a side cross-sectional view of the substrate wall shown in FIG. 6 after the installing new cooling holes according to the present disclosure.

After TBC 106 is formed, new cooling holes 110 may be installed in the substrate wall 60 as shown in FIG. 7. The cooling holes 110 may be installed by a laser or another suitable installation method. Further, the new cooling holes 110 may extend between the outer and inner surfaces 108 and 104, respectively, as shown. The new cooling holes 110 may be installed through the old cooling holes 66, 68, or 70, may be drilled through part of the old cooling holes 66, 68, or 70, or may be drilled through portions outside the old cooling holes 66, 68, and 70, as shown in FIG. 7. Furthermore, the old cooling holes 66, 68, and 70, now obstructed with filling agent 100, may retain enough structure after the installation of new cooling holes 110 such that cooling fluid only passes through the new cooling holes 110. Although FIG. 7 shows cooling holes 110 extending substantially perpendicularly through substrate wall 60 with respect to outer and inner surfaces 108 and 104, the new cooling holes 110 may be obliquely oriented with respect to surfaces 108 and 104 or may adopt other orientations as well. The shapes, sizes and orientations of the new cooling holes 110 may be determined by the skilled artisan according to each application.

INDUSTRIAL APPLICABILITY

From the foregoing, it can be seen that the present disclosure describes the closure of cooling holes in a substrate wall with enamel or ceramic paste after the removal of an original TBC layer (or otherwise exposing an outer surface of the substrate wall), the application of a new TBC layer on the outer surface of the substrate wall, the installation of new cooling holes, and the gas turbine engines using the resulting modified substrate wall. Such method of blocking the cooling holes and processes to improve or repair gas turbine engines may find industrial applicability in many applications including, but not limited to, aerospace applications such as airplanes.

Current trends in gas turbine engine design are requiring a flexible approach to modify or fill cooling holes in substrate walls. By taking advantage of the sealant ability of enamel or ceramic paste, their stability at elevated temperatures, their ability to obstruct air flow passage through the cooling holes when cured, and their ability to provide engine component walls with structural compactness such that newly applied TBC layers are associated with spallation resistance, the present disclosure provides a novel solution to afford an efficient strategy to fill cooling holes in gas turbine engine components with low cost and high flexibility. Since the modification may generate a modified substrate wall having a new TBC with a new pattern for cooling holes, the present disclosure is advantageous when compared to manufacturing a new substrate wall from scratch. Furthermore, since the filling agent materials left in the new structure wall have good thermal and structural stability during operation, it may become part of the new structure without interfering with the engine operation. Moreover, using the novel strategy to repair and modify the structure wall according to the present disclosure opens up new possibilities for gas turbine engines which may reduce costs associated with time-consuming, inflexible, and expensive manufacturing processes.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method for filling cooling holes in a component of a gas turbine engine, the component having an outer surface and an inner surface and a plurality of first cooling holes, the plurality of first cooling holes extending between the outer surface and the inner surface of the component, the method comprising:

removing a first thermal barrier coating from the outer surface of the component;

filling the plurality of first cooling holes with a filling agent;

removing excess filling agent from the outer surface of the component to level the outer surface of the component;

curing the filling agent to block the plurality of first cooling holes;

applying a second thermal barrier coating on the outer surface of the component and completely covering the cured filling agent; and installing a plurality of second cooling holes, the plurality of second cooling holes penetrating through the second thermal barrier coating and extending between the outer surface and the inner surface of the component.

2. The method of claim 1 wherein the first thermal barrier coating comprises a first ceramic top coating overlying a first metallic bond coating.

3. The method of claim 1 wherein the second thermal barrier coating comprises a second ceramic top coating overlying a second metallic bond coating.

4. The method of claim 1 wherein the step of curing the filling agent to block the plurality of first cooling holes obstructs cooling fluid flow through the plurality of first cooling holes.

5. The method of claim 1 wherein the filling agent is a ceramic paste.

6. The method of claim 5 wherein the ceramic paste is waterglass.

7. The method of claim 5 wherein the filling agent comprises a metal alloy powder to provide surface uniformity between the plurality of filled first cooling holes and the component.

8. The method of claim 5 wherein the filling the plurality of first cooling holes with the filling agent is performed by dipping the component in the filling agent.

9. A method for filling cooling holes in a component of a gas turbine engine, the component having an outer surface and an inner surface and a plurality of first cooling holes, the plurality of first cooling holes extending between the outer surface and the inner surface of the component, the method comprising the steps of:

removing a first thermal barrier coating from the outer surface of the component;

filling the plurality of first cooling holes with a filling agent;

curing the filling agent to block the plurality of first cooling holes;

applying a second thermal barrier coating on the outer surface of the component and completely covering the cured filling agent;

installing a plurality of second cooling holes, the plurality of second cooling holes penetrating through the second thermal barrier coating and extending between the outer surface and the inner surface of the component.

10. The method of claim 9 wherein the filling agent is a ceramic paste.

* * * * *